United States Patent [19]
Harris

[11] Patent Number: 5,315,112
[45] Date of Patent: May 24, 1994

[54] REAL TIME LASER SPOT TRACKING IN BOTH HORIZONTAL AND VERTICAL AXES

[75] Inventor: Ellis D. Harris, Claremont, Calif.

[73] Assignee: Xerox Corporation, Stamford, Conn.

[21] Appl. No.: 988,505

[22] Filed: Dec. 10, 1992

[51] Int. Cl.$^5$ ................................. H01J 3/14
[52] U.S. Cl. ........................ 250/235; 358/481
[58] Field of Search .................. 250/234, 235, 236; 358/494, 481

[56] References Cited

U.S. PATENT DOCUMENTS

| | | | |
|---|---|---|---|
| 4,980,549 | 12/1990 | Baldwin | 250/235 |
| 5,006,705 | 4/1991 | Saito et al. | 250/235 |
| 5,012,089 | 4/1991 | Kurusu et al. | 250/235 |
| 5,018,808 | 5/1991 | Meyers et al. | 250/235 |

Primary Examiner—David C. Nelms
Attorney, Agent, or Firm—Nola Mae McBain

[57] ABSTRACT

An optical system in which arrays of pseudo-corner cube retro reflectors are used to provide optical feedback of the horizontal and vertical positions of a scanning beam. The arrays of reflectors are located above and below the path of the scanning beam near the photoreceptor. The horizontal and vertical position information is then used to correct the alignment of the scanning beam.

10 Claims, 4 Drawing Sheets

REAL TIME LASER SPOT TRACKING IN BOTH HORIZONTAL AND VERTICAL AXES

BACKGROUND

This invention relates generally to a raster output scanner of a laser printing device and more particularly concerns a method in which pseudo optical retro reflectors are used for monitoring a scanning laser spot position in both horizontal and vertical axes in real time.

A conventional raster output scanner utilizes a light source, pre-scan optics, a modulator, a multi-faceted rotating polygon mirror as the scanning element, and post scan optics. The light source, which can be a laser source, produces a light beam and sends it to the modulator. The modulator receives electronic pixel information for modulating the light beam. The modulated light beam will be directed onto the rotating polygon. At the strike of the modulated light beam, the rotating polygon reflects the modulated light beam and causes the reflected light beam to revolve about an axis near the center of rotation of the rotating polygon and scan a straight line. This reflected light beam can be utilized to scan a document at the input of an imaging system or can be used to impinge upon a photographic film or a photosensitive medium, such as a xerographic drum at the output of the imaging system.

Laser printers using rotating polygons often include a line start system to accurately position the start of scan of each line in the raster plane. A line start system is necessary to avoid facet-to-facet variations that can cause unevenness in the scan lines. Many line start systems monitor the position of the scanned beam for starting the printing of the line in the raster plane. However, such systems can require multiple beams and synchronization signals to compensate for facet defects which affect the line start signal. U.S. Pat. No. 4,980,549 discloses such a system. However, such systems are complicated and only monitor the position of the beam in the horizontal plane, and then only at start of scan and/or end of scan.

Accordingly, it is the primary aim of the invention to provide a simplified method of detecting the position of a laser spot in both the horizontal and vertical planes.

Further advantages of the invention will become apparent as the following description proceeds.

SUMMARY OF THE INVENTION

Briefly stated and in accordance with the present invention, there is provided a simplified method of detecting both the horizontal and vertical positions of a laser spot using a multiplicity of detecting elements. The detecting elements are placed above and below the path of the beam and near the photoreceptor.

While the present invention will be described in connection with a preferred embodiment and method of use, it will be understood that it is not intended to limit the invention to that embodiment or procedure. On the contrary, it is intended to cover all alternatives, modifications and equivalents as may be included within the spirit and scope of the invention as defined by the appended claims.

| Alphanumeric List of Elements | |
|---|---|
| angle | A |
| angle | B |
| beam center | $B_{ct}$ |
| beam center | $B_{co}$ |
| translation of beam | $B_t$ |
| angle | a1 |
| angle | a2 |
| angle | a3 |
| laser | 10 |
| beam | 12 |
| pre-scan optics | 14 |
| scanning mechanism | 16 |
| post-scan optics | 18 |
| photoreceptor | 20 |
| exposure slit apparatus | 22 |
| plate | 24 |
| rectangular opening | 26 |
| upper pseudo-corner cube retro reflectors | 28 |
| lower pseudo-corner cube retro reflectors | 30 |
| front face | 32 |
| front face | 34 |
| front face | 36 |
| ridge line | 38 |
| ridge line | 39 |
| ridge line | 40 |
| photodiode detector | 42 |
| photodiode detector | 44 |
| vertical alignment signal | 46 |
| proper beam alignment | 48 |
| beam misalignment in the upward direction | 50 |
| beam misalignment in the downward direction | 52 |
| center | 54 |
| center | 56 |
| center | 58 |
| mirror | 60 |
| lens | 62 |
| piezoelectric stack | 64 |
| edge | 66 |
| edge | 68 |
| pivotable mounting | 69 |
| front face | 70 |
| data buffer | 72 |
| clock sync signal | 74 |
| pixel stream signal | 76 |
| synchronization logic | 78 |
| differential op amp | 80 |
| logic and driver | 82 |
| vertical alignment signal | 84 |
| signal | 88 |

DETAILED DESCRIPTION OF THE INVENTION

Figure 1:
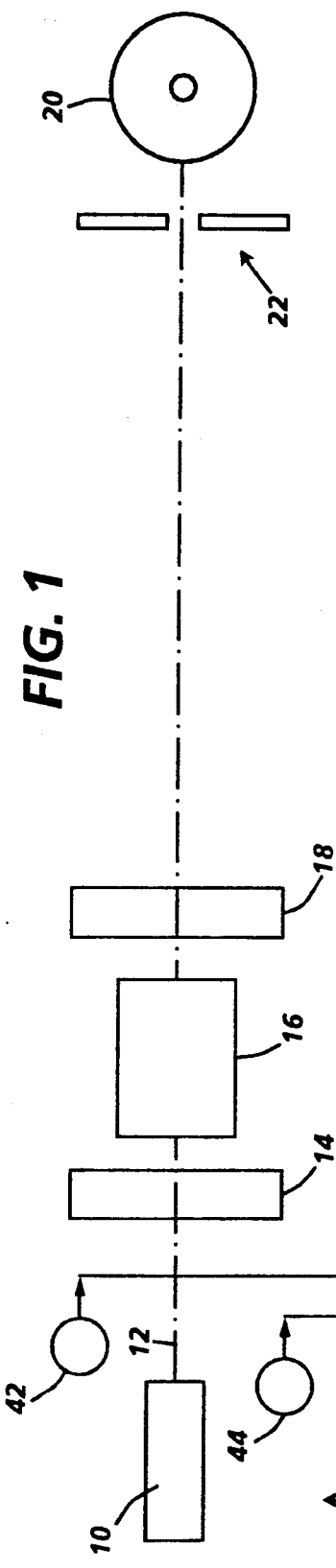
FIG. 1 is a side schematic view of a laser scanning system.

Turning now to FIG. 1, a simplified schematic view of a raster output scanner is shown implementing the disclosed invention. A laser 10 emits a beam 12 that propagates sequentially through pre-scan optics 14, a scanning mechanism 16, and post-scan optics 18 before striking a photoreceptor 20 as in conventional systems. In the invention, an exposure slit apparatus 22 is placed after the post-scan optics 18 and before the photoreceptor 20.

Figure 2:
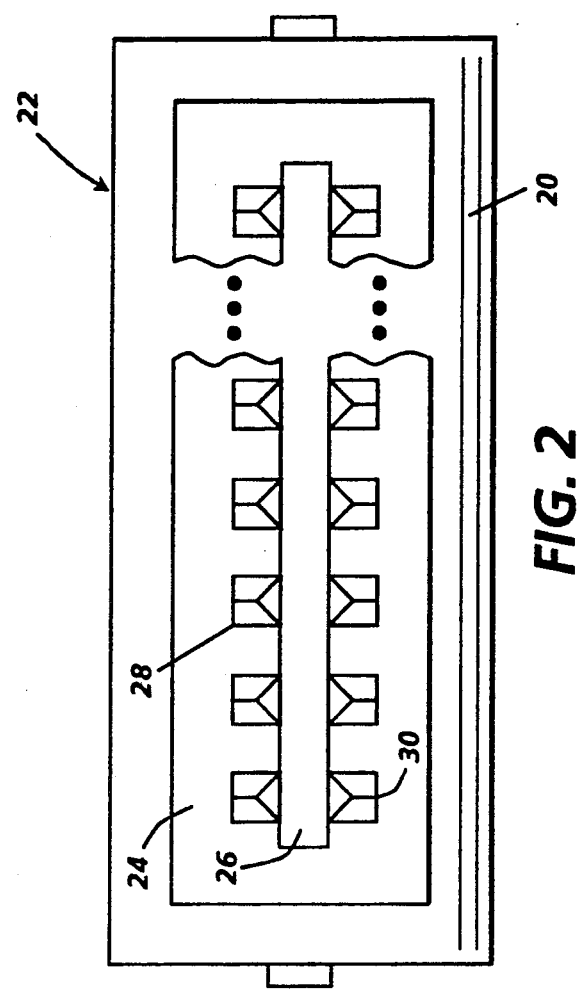
FIG. 2 is a front view of an exposure slit apparatus used in the laser scanning system.

The exposure slit apparatus 22 is shown in more detail in FIG. 2. The exposure slit apparatus 22 is comprised of a plate 24 with a rectangular opening 26 cut out that is approximately the width and height of a scan line. The rectangular opening 26 may be covered with a glass window (not shown). On either side of the rectangular opening 26 is a row of pseudo-corner cube retro reflectors, upper pseudo-corner cube retro reflectors 28 and low pseudo-corner cube retro reflectors 30. The upper pseudo-corner cube retro reflectors 28 are above the rectangular opening 26 and the lower pseudo-corner cube retro reflectors 30 are below the rectangular opening 26.

Figure 3:
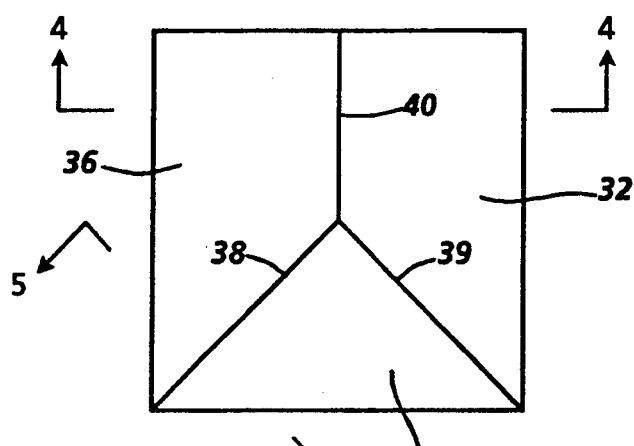
FIG. 3 is a front view of a pseudo-corner cube retro reflector.
Figure 4:
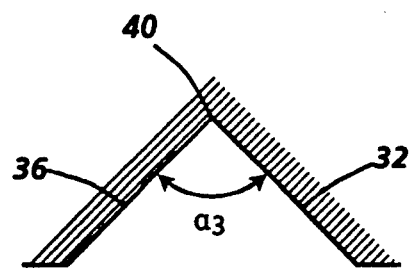
FIG. 4 is a cross-section of a pseudo-corner cube retro reflector taken along section line 4—4 of FIG. 3.
Figure 5:
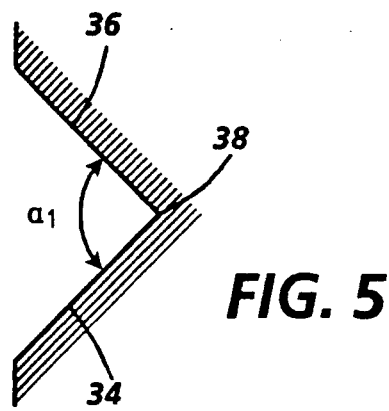
FIG. 5 is a cross section of a pseudo-corner cube retro reflector taken along section line 5—5 of FIG. 3.

A pseudo-corner cube retro reflector 28 is shown in more detail in FIGS. 3–5. FIG. 3 shows the front faces of the pseudo-corner cube retro reflector 28. Each pseudo-corner cube retro reflector 28 has three front faces 32, 34, 36. Ridge lines 38, 39, and 40 are defined at the intersections of the front faces 32, 34, 36. Ridge line 40 is the intersection of face 32 and face 36. Ridge line 38 is the intersection of face 36 with face 34 and ridge line 39 is the intersection of face 32 with face 34. The angle formed by the intersection of face 32 and face 36 at ridge line 40 is angle $\alpha 3$. The angle formed by the intersection of face 36 with face 34 along ridge line 38 is $\alpha 1$. The angle formed by the intersection of face 32 with face 34 along ridge line 39 is $\alpha 2$. The two angles $\alpha 1$, $\alpha 2$ formed along ridge lines 38, 39 are equal to each other. The angle $\alpha 3$ is fixed at 90 degrees.

A cross section of the angle $\alpha 3$ taken through a corner between the two faces 36,32, along ridge line 40, providing the tangential plane reflection is shown in FIG. 4. These two faces meet at an angle of 90 degrees and provide true retro reflection. Retro reflection is reflection identically back along or parallel to the incident beam path.

A cross section of the angle $\alpha 1$, through ridge line 38, between the two faces 36,34, providing reflection in a sagittal plane, is shown in FIG. 5. If angle $\alpha 1$ was also 90 degrees, the pseudo-corner cube retro reflectors 28, 30 would exactly reflect the incident beam 12 back along the path through the post-scan optics 18, scanning mechanism 16, and pre-scan optics 14 to the laser 10. By varying the angle $\alpha 1$ slightly from 90 degrees the beam 12 is reflected back along the incident beam path but with a slight angular offset to a position either above or below the laser 10 depending on whether the pseudo-corner cube retro reflectors are the upper pseudo-corner cube retro reflectors 28 or the lower pseudo-corner cube retro reflectors 30. The cross section of the angle $\alpha 2$ between the two faces 32, 34, also providing reflection in a sagittal plane, would be identical to that shown in FIG. 5 for angle $\alpha 1$.

The two rows of reflectors, upper pseudo-corner cube retro reflectors 28 and lower pseudo-corner cube retro reflectors 30, therefore cause any light beams received by them to be reflected back along the incident beam path with a slight angular offset. The reflection path is through the post-scan optics 18, the scanning mechanism 16, and the pre-scan optics 14. If the scanning mechanism 16 is a rotating polygon, the scanning mechanism 16 will "unscan" the scanning incoming beam, reflecting the beam to the photodiode detectors 42,44.

Returning to FIG. 2, each pseudo-corner cube retro reflector is made to be close to the size of one pixel. However, there is not a pseudo-corner cube retro reflector for each pixel along the scan line. A pseudo-corner cube retro reflector is only positioned for every other pixel along the scan line in the rows of pseudo-corner cube retro reflectors 28, 30 on either side of the rectangular opening 26 in the exposure slit apparatus 22.

Returning to FIG. 1, photodiode detectors 42, 44 are shown spatially separated on each side of the laser 10. These photodiode detectors 42, 44 are positioned to received the reflected beams from the rows of pseudo-corner cube retro reflectors 28,30 placed on the exposure slit apparatus 22. Photodiode detector 42 will receive beams reflected from the upper pseudo-corner cube retro reflectors 28 and photodiode detector 44 will receive beams reflected from the lower pseudo-corner cube retro reflectors 30. Since there is only a pseudo-corner cube retro reflector 28 for every other pixel, the beams received by the photodiode detectors 42,44 will be sensed as beam pulses.

Any portion of the beam 12 that passes through the rectangular opening 26 in the exposure slit apparatus 22 will expose the photoreceptor 20. If the laser beam size is purposely made to be slightly larger than the rectangular opening 26 in the exposure slit apparatus 22 then some portion of the beam is always returned to the photodiode detectors 42, 44 providing constant pulses of light to the photodiode detectors 42, 44 as the beam 12 scans along the scan line.

If the signals received from the photodiode detectors 42, 44 are summed together they can provide a pixel clock reference signal. This function can be accomplished with circuitry that is already known in the art. The pixel clock reference signal constitutes horizontal pixel alignment information and can be used in a line start system to synchronize and control extraction of the pixels in a line of data store within an electronic data buffer as is known in the art. In addition to providing horizontal alignment information this system also provides vertical alignment information using the scanning beam.

Figure 6:
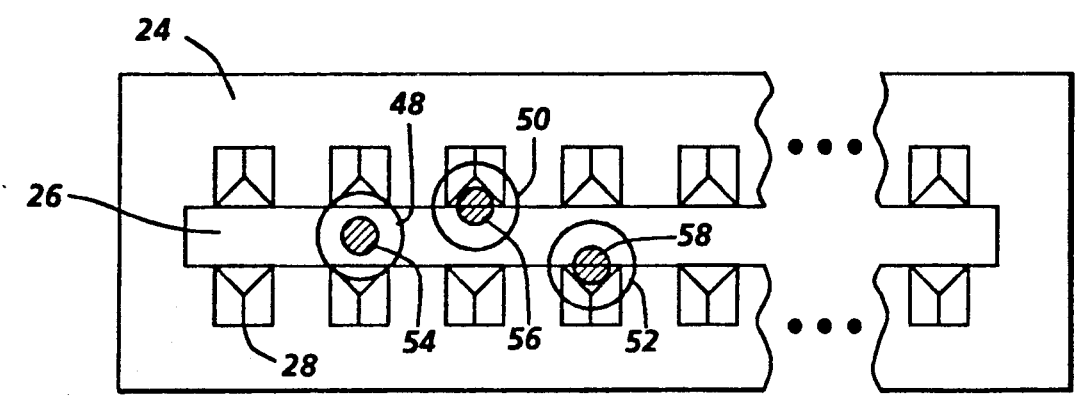
FIG. 6 is an enlarged front view of the exposure slit apparatus showing beam alignment or beam misalignment.

FIG. 6 shows a close up of the exposure slit apparatus 22 with the beam superimposed in three different positions (48, 50, 52) representing proper beam alignment 48, beam misalignment in the upward direction 50 and beam misalignment in the downward direction 52.

Proper beam alignment 48 is shown when the center 54 of the beam 48 is centered vertically in the rectangular opening 26 of the exposure slit apparatus 22. The center 54 of the beam 48 passes completely through the rectangular opening 26 in the exposure slit apparatus 22 to expose the photoreceptor 20 located behind the exposure slit apparatus 22. As a result the photodiode detectors 42, 44 will receive beams of similar strengths. If these two signals are subtracted from each other the lack of a resultant signal, a vertical alignment signal 46, from photodiode detectors 42, 44 describes proper beam alignment 48.

Beam misalignment in the upward direction 50 is shown when the center 56 is no longer centered vertically in the rectangular opening 26 in the exposure slit apparatus 22 but has drifted upward to a pseudo-corner cube retro reflector 28 above the rectangular opening 26 in the exposure slit apparatus 22. When the beam is in this position, more light is reflected by the top row of pseudo-corner cube retro reflectors 28 and less light is reflected by the bottom row of pseudo-corner cube retro reflectors 30 on the exposure slit apparatus 22. As a result the photodiode detectors 42, 44 will receive beams of different strengths. Photodiode detector 42 will receive a stronger beam, generating a stronger signal. Photodiode detector 44 will receive a weaker beam, generating a weaker signal. If these two signals are subtracted from each other the resultant vertical alignment signal 46 describes beam misalignment in the upward direction 50.

Beam misalignment in the downward direction 52 is shown when the center 58 is no longer centered vertically in the rectangular opening 26 in the exposure slit apparatus 22 but has drifted downward to a pseudo-corner cube retro reflector 30 below the rectangular opening 26 in the exposure slit apparatus 22. When the beam is in this position, more light is reflected by the bottom row of pseudo-corner cube retro reflectors 30 and less light is reflected by the top row of pseudo-corner cube retro reflectors 28 on the exposure slit apparatus 22. As a result the photodiode detectors 42, 44 will receive beams of different strengths. Photodiode detector 42 will receive a weaker beam, generating a weaker signal. Photodiode detector 44 will receive a stronger beam, generating a stronger signal. If these two signals are subtracted from each other the resultant vertical alignment signal 46 describes beam misalignment in the downward direction 52.

In a similar embodiment, the two rows of pseudo-corner cube retro reflectors, the upper pseudo-corner cube retro reflectors 28 and the lower pseudo-corner cube retro reflectors 30, and the two photodiode detectors 42, 44, could be replaced by two rows of photodiode detectors, an upper row of photodiode detectors and a lower row of photodiode detectors located where the upper pseudo-corner cube retro reflectors 28 and the lower pseudo-corner cube retro reflectors 30 are located respectively. The upper row of photodiode detectors would provide a plurality of signals that would be summed or logically or'd together to provide the equivalent signal from the photodiode detector 42 in the original system. The lower row of photodiode detectors would provide a plurality of signals that would be summed or logically or'd together to provide the equivalent signal generated by the photodiode detector 44 in the original system. The operation of the rest of the system is identical.

Again, these functions can be accomplished with circuitry known in the art. Once the information has been generated in the form of a signal, the signal can be used to control the vertical alignment of the scanning beam 12.

Figure 7:
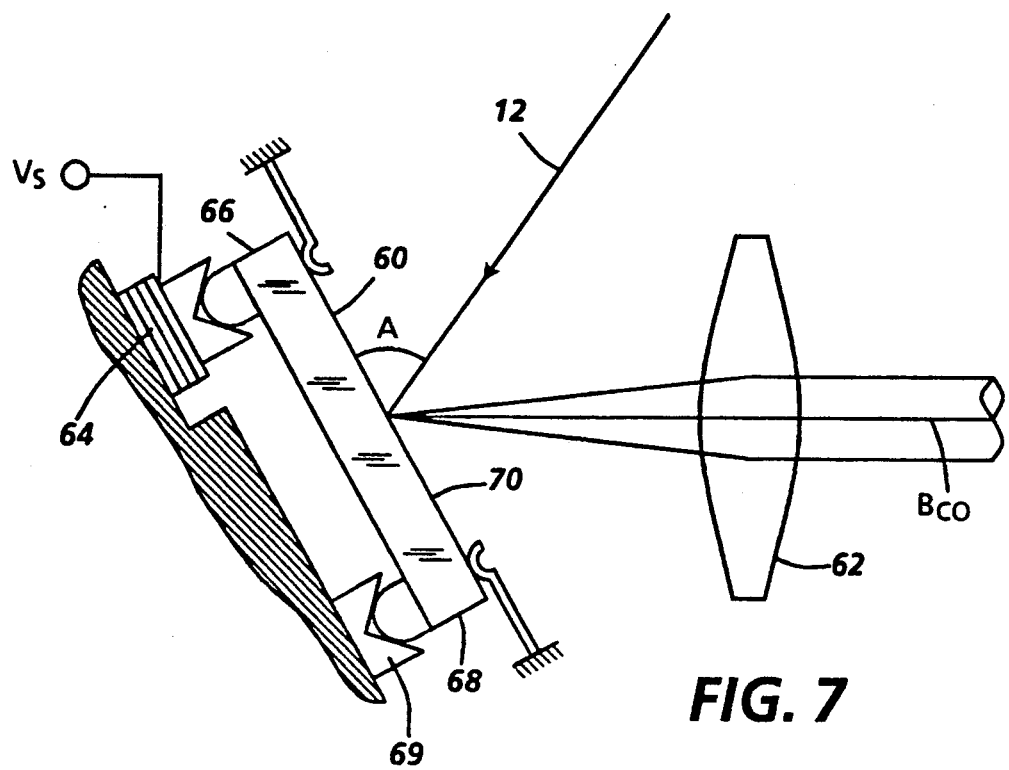
FIG. 7 is a side view of a beam vertical alignment system.
Figure 8:
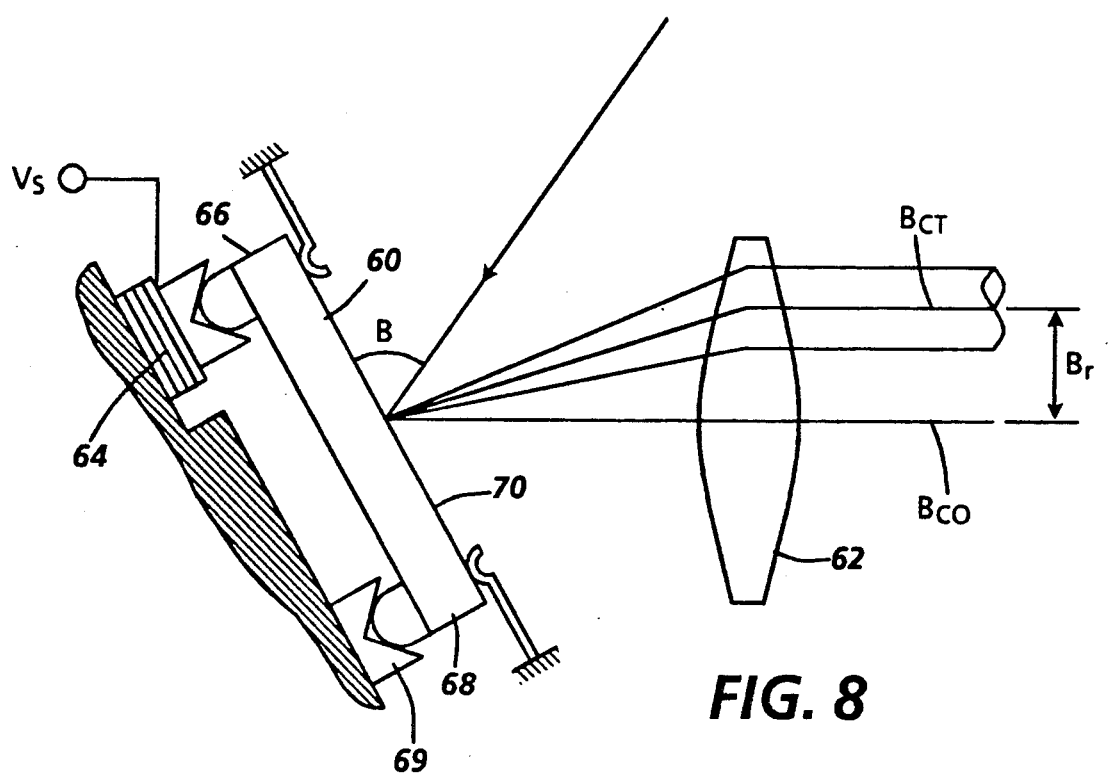
FIG. 8 is a side view similar to FIG. 7 showing the vertical alignment system after the beam has been moved for alignment.

FIGS. 7 and 8 illustrate a vertical beam alignment mechanism including an electronically movable mirror 60. In FIG. 7, the beam 12 strikes the mirror 60 and is reflected to a lens 62. A piezoelectric stack 64 supports one edge 66 of the mirror while the opposite edge 68 is constrained by a pivotable mounting 69. The mirror 60 has a front face 70 which reflects the beam 12 to the lens 62 dependant upon an incident angle A. Beam center $B_{co}$ is the center of incoming beam 12 after it is reflected from the mirror 60 and as it passes through the lens 62.

In FIG. 8, the piezoelectric stack 64 has moved one edge 66 of the mirror 60 while the other edge 68 has pivoted on mounting 69. The front face 70 of the mirror 60 is now at a different incident angle B with respect to the incoming beam 12. The beam center $B_{ct}$ of beam 12 after reflection from the mirror 60 will pass through the lens 62 in a different position. The translation $B_t$ of the beam is the distance between the beam center $B_{co}$ before the mirror 60 is moved and the beam center $B_{ct}$ after the mirror 60 is moved.

Figure 9:
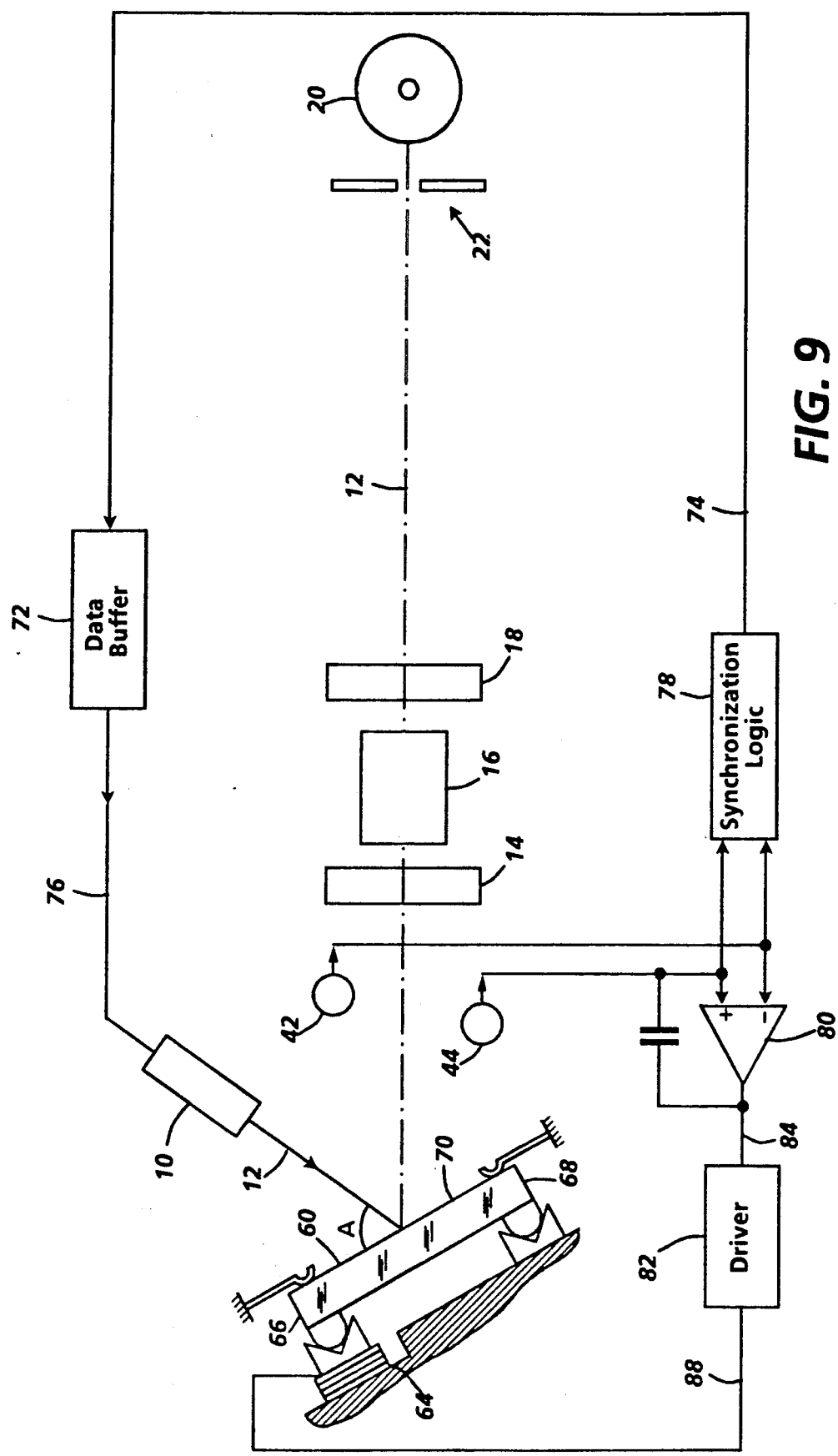
FIG. 9 is a side view of the laser scanning system of FIG. 1 including the vertical alignment system of FIG. 8.

FIG. 9 shows a complete system for real time detection and correction of horizontal and vertical alignment. A laser 10 emits a beam 12 that propagates sequentially through vertical alignment correcting mirror 60, pre-scan optics 14, a scanning mechanism 16, post-scan optics 18, and exposure slit apparatus 22 before striking the photoreceptor 20. The pseudo-corner cube retro reflectors 28 and 30 of the exposure slit apparatus 22 feed alignment information to the photodiode detectors 42, 44 respectively. The information from the photodiode detectors 42, 44 is summed and compared with clock logic to provide a clock sync signal 74, used to extract data from a data buffer 72 pixel by pixel. The information from the photodiode detectors 42, 44 is also subtracted to provide a vertical alignment signal 84 which is fed back to the piezoelectric stack 64 of the vertical alignment correcting mirror 60.

The clock sync signal 74, for horizontal alignment, is generated by synchronization logic 78. Synchronization logic 78 receives input from the photodiode detectors 42, 44. The incoming data is compared with an internally generated clock signal to synchronize the internal clock to the horizontal alignment of the beam 12. The resultant clock sync signal 74 can be used to extract data from a data buffer 72 pixel by pixel. The data in data buffer 72 is fed to the laser 10 as a pixel stream signal 76 from the data buffer 72.

The vertical alignment logic is performed by using a subtraction function and some additional logic and a driver to drive the piezoelectric stack. This is a continuous feedback system. If the beam 12 is out of alignment in the upward direction a stronger signal will be received by photodiode detector 42 then by photodiode detector 44. The signals from the photodiode detectors 42, 44 will be sent to the differential op amp 80. The differential op amp 80 produces a signal 84 which represents the difference between the signals received by the photodiode detectors 42, 44. Signal 84 is received by driver 82. The driver 82 produces the correct output signal 88 on line 90 to drive the piezoelectric stack 64. The piezoelectric stack is then activated in accordance with the signal received to adjust the mirror for beam alignment. As the mirror 60 moves to bring the beam 12 into proper alignment, the differential vertical alignment signal 84 between the photodiode detectors 42, 44 decreases. When the beam 12 is finally in proper alignment, there will be no difference in the signals received by the photodiode detectors 42, 44, and thus no signal 88 is applied to the mirror 60, and the mirror 60 will stop moving. This network constitutes a closed loop servo feedback system and could be a first, second or higher order servo system as is well known in the art.

I claim:

1. In a raster scanner where a beam is scanned along a given path:
   a) first and second reflector means in the path of the scanning beam,
   b) said first reflector means being located on one side of the path of the scanning beam and said second reflector means being spaced from said first reflector means and located on the opposite side of the scanning beam, said spacing between said first and second reflector means being in a direction generally perpendicular to the path of the scanning beam, c) said first and second reflector means being arranged in such a manner that when the scanning beam is on center, each of said first and second reflector means will receive substantially equal portions of the beam and when the beam is off center, the portions of the beam received by said first and second reflector means will be unequal, d) first and second detector means arranged to receive beam reflections from said first and second reflector means, respectively, e) determining means operably connected to said first and second detector means for determining if said first and second reflector means receive equal or unequal portions of the beam, and f) means responsive to said determining means when said first and second detector means receive unequal portions of said scanning beam to correct the alignment of the scanning beam until said determining means determines the said first and second reflector means receives substantially equal portions of the scanning beam.

2. The structure as recited in claim 1 further comprising a scanning means and a light emitting means wherein said detector means is spaced between said scanning means and said light emitting means.

3. The structure as recited in claim 1 wherein said first and second reflector means each extend coextensive with a substantial portion of the scanning path of the beam and each of said first and second reflector means comprises a plurality of reflector means spaced from one another in the direction of the scan.

4. The structure as recited in claim 3 wherein each of said spaced apart reflector means is a pseudo-corner cube retro reflector.

5. In a raster scanner where a beam is scanned along a given path:

a) first and second reflector means in the path of the scanning beam and extending coextensive with a substantial portion of the scanning path of the beam, b) said first reflector means being located on one side of the path of the scanning beam and said second reflector means being spaced from said first means and located on the opposite side of the scanning beam, said spacing between said first and second reflector means being in a direction generally perpendicular to the path of the scanning beam, c) said first and second reflector means being arranged in such a manner that either one or both of said first and second means will receive a portion of the beam during the beam scan, d) first and second detector means arranged to receive beam reflections from said first and second reflector means, respectively, and e) determining means operably connected to said first and second detector means for determining the position of the beam from the beam reflected to said first and second detector means from said first and second reflector means.

6. The structure recited in claim 5 wherein said first and second reflector means each comprise a plurality of reflector means spaced from one another in the direction of the scan.

7. The structure recited in claim 6 wherein each of said spaced apart reflector means is a pseudo-corner cube retro reflector.

8. The structure recited in claim 5 wherein said determining means comprises electronic summation circuitry.

9. The structure recited in claim 7 wherein said pseudo-corner cube retro reflector comprises first, second and third faces, said first, second and third faces being arranged to return the beam to a position displaced from its origin.

10. The structure recited in claim 9 wherein a) said first face has an intersection forming a first angle with said second face, b) said first face has an intersection forming a second angle with said third face, c) said second face has an intersection forming a third angle with said third face, d) said first angle being substantially 90 degrees, and e) said second and third angles vary slightly from 90 degrees.

* * * * *